UNITED STATES PATENT OFFICE.

PAUL U. DUCOMMON, OF KANSAS CITY, MISSOURI.

FERTILIZER COMPOSITION.

1,368,249. Specification of Letters Patent. Patented Feb. 15, 1921.

No Drawing. Application filed July 14, 1919. Serial No. 310,733.

*To all whom it may concern:*

Be it known that I, PAUL U. DUCOMMON, a citizen of Switzerland, residing at Kansas City, in the county of Jackson and State of Missouri, have invented certain new and useful Improvements in Fertilizer Composition, of which the following is a specification.

The object of my invention is the production of a concentrated fertilizer to be used as a plant food and consisting generally of a composition of matter and the manifold concentrates of bacteria found in common barnyard manure, which when mixed with seeds and applied to the soil results in the transformation and absorption of mineral and vegetable matter present in the soil and in the air, thereby producing an economical and efficient plant food which will perform its function for several years after being applied to the soil.

My composition consists of bacteria developed from barnyard manure and supplying said bacteria with food which enables them to multiply many fold and exist for several years after being applied to the soil. The food in question may consist of animal, vegetable and mineral matter. The animal matter may consist of flesh, meat extract, meat broth, peptone, blood, bone, fat, gelatin, etc., or any combination thereof. The vegetable matter may consist of vegetable fat, pulverized corn cobs, straw, agar, peptone, etc., or any composition thereof. The mineral matter may consist of water, soil, and any alkaline, or suitable combination thereof.

In preparing the composition I prefer to use the ingredients in about the following proportions, viz.:

| Ingredient | Amount | |
|---|---|---|
| Water | 1,000 | cubic centimeters. |
| Meat extract | .5 | per cent. |
| Peptone | 1.0 | " |
| Calcium carbonate | 10.0 | " |
| Dried blood | 27.0 | " |
| Dried pulverized vegetable matter | 50.0 | " |
| Pulverized bone | 10.0 | " |
| Fat | 1.0 | " |

Good results may be obtained, however, when the ingredients are varied within the following limits: meat extract .2 to .7 per cent.; peptone .0 to 2; calcium carbonate 10 to 20 per cent.; dried blood 5 to 40 per cent.; dried pulverized vegetable matter 20 to 60 per cent.; pulverized bone 0 to 40 per cent.; fat 0 to 2 per cent.

The water, meat extract, peptone and calcium carbonate in the proportions stated are first heated to a boiling point to reduce the meat extract and the peptone to a solution and allow the calcium carbonate to readily neutralize the acid present in said solution. The solution is then permitted to cool, after which a suspension of bacteria found in manure is added, together with pulverized roots of plants containing nitrogen fixing azobacteria, of various types, and then subjected to the process of incubation at 37 degrees centigrade for a period of from twenty-four to forty-eight hours, to reproduce the bacteria manifold.

The organic matter consisting of dried blood, dried pulverized vegetable matter, pulverized bone and fat in the proportions above-mentioned are then added with sufficient soil to make the composition equal in weight to the seeds with which it is to be used. The whole is then subjected to the process of incubation at 20 to 38 degrees centigrade for a period of twenty-four to forty-eight hours to reproduce the bacteria and their by-product, after which the composition is treated by exposure to warm air of 25 to 38 degrees centigrade. The composition is then reduced to powdered form and may be put up in packages for the market.

The peptone and dried blood may in some cases be omitted to reduce the cost of the composition when a chemical or vegetable product is substituted.

The fertilizer is mixed in a dry state with seeds when the same are planted and forms an efficient plant food. When prepared it may be mixed with liquid preparatory to applying it to the soil.

When pulverized corn cobs are employed they act as a sponge in absorbing moisture which renders the sugar and starchy constituents available as food for the sustenance of the bacteria.

My composition is rich in bacteria and azobacteria organisms and their by-products, and results in the reproduction of bacteria manifold which fertilizes the plant and transforms the mineral and vegetable matter found in the soil to plant food.

I claim:

1. A commercial fertilizer which consists of bacteria developed from barnyard manure, and a vegetable food which is mixed with said bacteria to enable the same to multiply and exist for a considerable period of time after being applied to the soil.

2. A commercial fertilizer which consists of bacteria developed from barnyard manure, and an animal food which is mixed with said bacteria to enable the same to multiply and exist for a considerable period of time after being applied to the soil.

3. A commercial fertilizer which consists of bacteria developed from barnyard manure, and a vegetable and animal food which is mixed with said bacteria to enable the same to multiply and exist for a considerable period of time after being applied to the soil.

4. A commercial fertilizer which consists of bacteria developed from barnyard manure, and a food consisting of vegetable, animal and mineral matter which is mixed with the bacteria to enable the same to multiply and exist for a considerable period of time after being applied to the soil.

5. A fertilizer culture prepared from barnyard manure to give a high bacterial inoculation to the soil, with the proper food for the bacteria to reproduce after being applied to the soil and to transform such a medium to plant food.

6. A bacterial culture prepared from barnyard manure and combined with foods including pulverized corn cobs to retain moisture and sustain the bacteria after being applied to the soil.

In testimony whereof I affix my signature in the presence of two witnesses.

PAUL U. DUCOMMON.

Witnesses:
F. C. Fischer,
L. J. Fischer.